United States Patent

[11] 3,625,889

| [72] | Inventor | Claud D. Branscum |
| | | Bartlesville, Okla. |
| [21] | Appl. No. | 853,938 |
| [22] | Filed | Aug. 28, 1969 |
| [45] | Patented | Dec. 7, 1971 |
| [73] | Assignee | Phillips Petroleum Company |

[54] WELL COMPLETION FLUIDS
2 Claims, No Drawings

[52] U.S. Cl. .................................................... 252/8.5 A,
106/194, 106/197 C, 106/203, 166/246, 252/8.5
C, 252/8.55 R, 252/311, 252/316
[51] Int. Cl. ...................................................... C10m 3/22,
C08b 21/30
[50] Field of Search ............................................ 252/8.5 C,
8.5 A, 8.55 A; 166/246; 106/194, 197 C, 203

[56] References Cited
UNITED STATES PATENTS

| 2,805,722 | 9/1957 | Morgan et al. ................ | 252/8.55 |
| 2,969,322 | 1/1961 | Weiss et al. ................... | 252/8.55 |
| 3,000,818 | 9/1961 | Abbott .......................... | 252/8.55 |
| 3,012,606 | 12/1961 | Brooke .......................... | 252/8.55 |
| 3,198,268 | 8/1965 | Lindblom et al. ............. | 252/8.5 X |
| 3,319,715 | 5/1967 | Parks ............................ | 252/8.5 X |

*Primary Examiner*—Herbert B. Guynn
*Attorney*—Young and Quigg

ABSTRACT: Aqueous high-density well drilling, completion and packer fluids containing calcium chloride, a water soluble salt of carboxyalkyl cellulose and a gum produced by the action of a Xanthomonas bacterium on sugars.

WELL COMPLETION FLUIDS

This invention relates to well completion fluids.

In one of its more specific aspects, this invention relates to high-density well completion and packer solutions.

It is conventional to employ high-density solutions as completion and packer fluids in petroleum recovery operations. Such solutions are prepared by dissolving large quantities of certain inorganic salts in water. For example, solutions having a density of about 12 pounds per gallon can be prepared by dissolving calcium chloride in water.

Such solutions frequently include other components which enhance the value of the solution. One of the most frequently employed solutions to which an inorganic salt is added is one containing a water-soluble salt of carboxyalkyl cellulose, such as carboxymethyl cellulose. However, the addition of the inorganic salt to the carboxyalkyl cellulose solution frequently causes some of the latter to be expelled from the solution. While some such expulsion can be tolerated, it is desirable that such expulsion be minimized.

Under the prior known methods, when the salt solution density was to be maintained at no less than about 11 pounds per gallon, it was difficult, if not impossible, to add sufficient inorganic salt to a solution and maintain sufficient carboxymethyl cellulose in the solution to be effective. The method of this invention is directed toward the solution of that problem.

According to the method of this invention there is provided a process for preparing a high-density drilling fluid which comprises adding a carboxyalkyl cellulose and a polysaccharide to an aqueous solvent and incorporating calcium chloride in said solvent.

Accordingly, it is an object of this invention to provide a method of preparing improved well completion fluids.

It is another object of this invention to provide an improved well completion fluid.

Also according to this invention there is provided a high-density drilling fluid which comprises an aqueous medium, carboxyalkyl cellulose, a polysaccharide and calcium chloride.

Carboxyalkyl celluloses whose use is contemplated in this invention are those conventionally employed and include carboxymethyl cellulose, ammonium carboxymethyl cellulose, and the like. The method of this invention is also applicable to all conventionally employed materials of this general class. These materials will be included in the final solution in an amount from about one-half to about 1½ pounds per barrel of solution. One carboxymethyl cellulose which is commercially available is Drispac*(*Trademark) as marketed by Drilling Specialties Company, Bartlesville, Oklahoma.

The inorganic salt whose use is contemplated by this invention is calcium chloride. Its use is contemplated to the extent that its concentration in the final solution is of any desired value, generally being from about 35 to about 220 pounds per barrel of solution, preferably from about 130 to about 180 pounds per barrel of solution. Calcium chloride can be employed in any of its commercially available forms and purities, including pellets such as Peladow, available from the Dow Chemical Company.

The polysaccharide whose use is contemplated is a polysaccharide gum produced by fermentation of sugars, synthesized by the action of the bacterium "Xanthomonas campestris." Such a polysaccharide is "Kelzan XC," also known as "XC-polymer," marketed by Kelco Company, Houston, Tex. Its use is contemplated in the final solution to the extent of about one-half pound to about 1½ pounds per barrel of solution.

A 42-gallon barrel of one solution prepared according to the method of this invention and having a density of about 11 pounds per gallon is comprised of about 310 pounds of water containing 155 pounds of 94 to 97 percent pure calcium chloride, one-half to 1½ pounds of carboxymethyl cellulose, and one-half to 1½ pounds of XC-polymer.

This solution is prepared by adding these components in any order to the aqueous solvent, preferably water. However, it is preferred that the carboxymethyl cellulose be added first under ambient conditions, the XC-polymer being added to the resulting solution under ambient conditions, with the calcium chloride being added thereafter.

The method of this invention acts to prevent any substantial settlement of the components from the solution. This is in contrast to that settlement which normally takes place within about 4 hours when such solutions are prepared in the absence of the inclusion of the polysaccharide.

The method of this invention is illustrated by the following data indicating the stability of calcium chloride solutions weighing about 11 pounds per gallon, prepared both according to, and in the absence of, the method of this invention. Data are as follows:

| Carboxymethyl Cellulose in Solution, 0/bbl. | Additive, 0/bbl. | Separation After | |
|---|---|---|---|
| | | 1 day | 7 days |
| 0.5 | 1.5 biopolymer | No | Yes |
| 1.0 | 2.0 guar gum | Yes | Yes |
| 0.5 | 1.0 polysaccharide | No | No |
| 0.5 | 1.5 polysaccharide | No | No |
| 1.0 | 1.0 polysaccharide | No | No |
| 1.5 | 0.5 polysaccharide | No | Yes |

The data indicate that the polysaccharide concerned is effective as a means of substantially eliminating settlement from completion and packer fluids.

It will be evident from the foregoing that various modifications can be made to the method and to the solutions of this invention. However, such are considered as being within the scope of the invention.

I claim:

1. An aqueous drilling fluid consisting essentially of an aqueous solution calcium chloride, a water-soluble salt of carboxymethyl cellulose in an amount within the range of about one-half to 1½ pounds per barrel of fluid and a polysaccharide gum produced by the action of the bacterium "Xanthomonas campestris," on sugars said gum being present in an amount within the range of about one-half to about 1½ pounds per barrel of fluid sufficient to prevent any substantial expulsion of said carboxymethyl cellulose from said fluid, said fluid having a density of not less than about 11 pounds per gallon.

2. The drilling fluid of claim 1 in which said calcium chloride is present in said fluid in an amount of about 155 pounds per barrel of fluid.

* * * * *